R. H. Burke,
Cutting Boiler Tubes.

№ 61,392.  Patented Jan. 22, 1867.

Witnesses.

Inventor.
R. H. Burke
Per Munn & Co.
Attorneys

United States Patent Office.

RICHARD H. BURKE, OF GREENPOINT, NEW YORK.

Letters Patent No. 61,392, dated January 22, 1867.

IMPROVEMENT IN TOOLS FOR CUTTING OFF BOILER TUBES.

*The Schedule referred to in these Letters Patent and making part of the same.*

TO ALL WHOM IT MAY CONCERN:

Be it known that I, RICHARD H. BURKE, of Greenpoint, in the county of Kings, and State of New York, have invented a new and improved Tool for Cutting Boiler Tubes; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a tool which is intended to cut off boiler tubes inside the tube sheet, but which may also be used for cutting off the ends of such tubes. Said tool consists of a pipe, which contains a head provided with slots to retain the cutters, and with a feed-screw, in such a manner that by the action of the feed-screw and head the cutters can be gradually fed out as the operation of cutting progresses, and boiler tubes of any desired thickness can be cut with the greatest ease and facility. The pipe which contains the head and the cutters is provided with a series of sleeves in such a manner that said pipe can be adapted to boiler tubes of different diameters.

Figure 2:
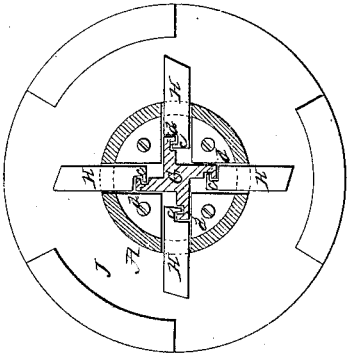
Figure 2 is a transverse section of the same, taken in the plane indicated by the line $x\ x$, fig. 1.
Figure 1:
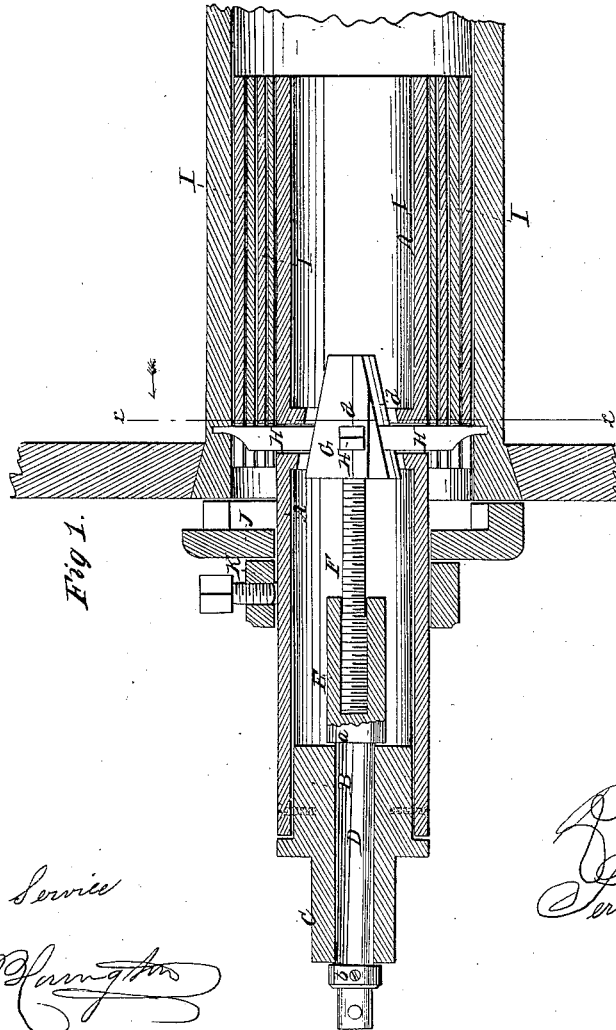
Figure 1 represents a longitudinal central section of this invention.

A represents a pipe of wrought iron or any other suitable material, and provided at one end with a head, B, which is rigidly secured in the pipe, and from which extends a square projection, C, which serves to turn the pipe A by a suitable wrench. The head B is perforated, in a longitudinal direction, with a hole large enough to admit the stem D of a tubular nut, E; and said stem is prevented from moving in a longitudinal direction in the head B by a shoulder, $a$, on one, and a ring, $b$, on the other end, as clearly shown in fig. 1 of the drawings. The nut E is bored out and tapped to receive the screw-shank F of the head G, from which extend the cutters H. These cutters are connected to the head G by means of lips $c$, which catch in suitable guide-grooves $d$ in the head, as shown in fig. 2 of the drawings. These guide-grooves extend throughout the entire length of the head, and by imparting to the head a longitudinal motion the cutters are fed out or drawn in as the case may be. The pipe A extends beyond the cutter-head, and it is made of such a diameter that it will fit in the tube to be cut. In order to adapt said pipe to tubes of different size, I fit on it a series of sleeves, I, the outside diameters of which correspond to different size tubes. By these means one and the same tool can be used for cutting tubes of five or more different sizes.

In operating this tool the pipe A is guided by a cap, J, which is held up against the outer surface of the tube sheet by a ring, K, which is secured on said pipe by a set-screw or any other suitable means. After the pipe has thus been secured in the proper position in the tube to be cut, the cutters are fed out by turning the stem D and nut E independent of the pipe A; said stem being perforated with a hole to receive a pin or handle which serves to turn the same in either direction, or instead of the hole and pin any other suitable means may be employed to produce the required feed motion. When the points of the cutters strike the inner circumference of the tube to be cut, the pipe A is turned by applying a wrench to the square projection of the head B, and the cutters begin to cut into the tube. As this operation progresses the cutters are gradually fed out by turning the stem D and nut E in the proper direction until the points of said cutters pass clear through the tube, when the cutting operation is completed.

It will be readily understood that by this arrangement the operation of cutting boiler tubes can be effected with little trouble or exertion, and without producing an injurious jar on any part of the boiler or of the remaining tubes.

My tool may also be used with advantage for cutting the ends of boiler tubes to the proper length, and to square the same up previous to securing them in the tube sheets.

Having thus described my invention, what I claim as new, and desire to secure by Letters Patent, is—

1. The cutter-head G, with feed-screw F and tubular nut E, in combination with the cutters H and pipe A, constructed and operating substantially as and for the purpose described.

2. The supplementary sleeves I, in combination with the pipe A and head G carrying the cutters H, substantially as and for the purpose set forth.

RICHARD HENRY BURKE.

Witnesses:
WM. F. MCNAMARA,
W. HAUFF.